United States Patent
Wu

(10) Patent No.: US 6,901,413 B1
(45) Date of Patent: May 31, 2005

(54) REMOVING DUPLICATE OBJECTS FROM AN OBJECT STORE

(75) Inventor: Charles Wu, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/272,481

(22) Filed: Mar. 19, 1999

(51) Int. Cl.[7] .............................................. G06F 17/30
(52) U.S. Cl. ................. 707/201; 707/102.1; 707/104.1; 709/204; 709/206; 709/234
(58) Field of Search ............................... 707/1–10, 102, 707/104; 709/204, 206, 234

(56) References Cited

U.S. PATENT DOCUMENTS

| | | | |
|---|---|---|---|
| 3,878,384 A | | 4/1975 | Bowker |
| 5,473,691 A | * | 12/1995 | Menezes et al. ............. 713/161 |
| 5,479,654 A | | 12/1995 | Squibb |
| 5,684,990 A | | 11/1997 | Boothby |
| 6,044,381 A | | 3/2000 | Boothby |
| 6,052,735 A | * | 4/2000 | Ulrich et al. ................ 709/236 |
| 6,101,507 A | * | 8/2000 | Cane et al. .................. 707/204 |
| 6,125,369 A | | 9/2000 | Wu |
| 6,141,664 A | | 10/2000 | Boothby |
| 6,263,362 B1 | * | 7/2001 | Donoho et al. ............. 709/207 |

OTHER PUBLICATIONS

Microsoft Coporation. Microsoft Office Developer Forum—... Guide—Microsoft Outlook Objects [web page] Feb. 3, 1997. http:/www.microsoft.com/officedev/articles/opg/005/005.html, 1997 [Accessed Mar. 1, 1999].

Bryne, Randy. "The Microsoft Outlook 97 Automation Server Programming Model". Mar. 3, 1997.

Microsoft Corporation, RecurringEvent Object [web page]. http://msdn.microsof.com/library/sdkdoc/exhange/spchap3_81h0.html. [Accessed Mar. 11, 1999].

Microsoft Corporation. AppointmentItem Object [web page]. http://msdn.microsof.com/library/sdkdoc/mapi/ole-objaf_5flg.html. [Accessed Mar. 9, 1999].

Microsoft Corporation. RecurrencePattern Object [web page]. http://msdn.microsof.com/library/sdkdoc/mapi/ole-objis_3wvo.html. [Accessed Mar. 9, 1999].

* cited by examiner

Primary Examiner—Jean M. Corrielus
Assistant Examiner—Anh Ly
(74) Attorney, Agent, or Firm—Leydig & Voit & Mayer

(57) ABSTRACT

A computer program for removing duplicate objects from an object store. The program allows the user to select which properties of the objects will be compared to determine equivalence. These properties are then read and a signature number is calculated based on the values of the those properties, using the cyclic redundancy code. Prior to the calculation of the signature, special cases are accounted for by modifying the properties. Such special cases can include: missing critical properties which can be calculated, text field formatting and leading and lagging spaces, order of attachments, order of categories, name properties, and recurring appointments. Once the signature values are calculated, objects with the same signature are, by definition, equivalent by the properties the user selected. Prior to discarding all but one of the equivalent objects, the program can check whether the object contains a link. As between two equivalent objects, the one with the link should be retained.

38 Claims, 11 Drawing Sheets

| Account | EntryID | OrganizationalIDNumber |
|---|---|---|
| Anniversary | FileAs | OtherAddress |
| AssistantName | FirstName | OtherAddressCity |
| AssistantTelephoneNumber | FormDescription | OtherAddressCountry |
| BillingInformation | Forward | OtherAddressPostalCode |
| Birthday | FTPSite | OtherAddressPostOfficeBox |
| Body | FullName | OtherAddressState |
| Business2TelephoneNumber | FullNameAndCompany | OtherAddressStreet |
| BusinessAddress | Gender | OtherFaxNumber |
| BusinessAddressCity | GovernmentIDNumber | OtherTelephoneNumber |
| BusinessAddressCountry | Hobby | OutlookInternalVersion |
| BusinessAddressPostalCode | Home2TelephoneNumber | OutlookVersion |
| BusinessAddressPostOfficeBox | HomeAddress | PagerNumber |
| BusinessAddressState | HomeAddressCity | PersonalHomePage |
| BusinessAddressStreet | HomeAddressCountry | PrimaryTelephoneNumber |
| BusinessFaxNumber | HomeAddressPostalCode | *PrintOut* |
| BusinessHomePage | HomeAddressPostOfficeBox | Profession |
| BusinessTelephoneNumber | HomeAddressState | *PropertyChange* |
| CallbackTelephoneNumber | HomeAddressStreet | RadioTelephoneNumber |
| CarTelephoneNumber | HomeFaxNumber | Read |
| Categories | HomeTelephoneNumber | ReferredBy |
| Children | Importance | *Reply* |
| *Close* | Initials | *ReplyAll* |
| *Close* | ISDNNumber | *Save* |
| Companies | JobTitle | *SaveAs* |
| CompanyandFullName | Journal | Saved |
| CompanyMainTelephoneNumber | Language | SelectedMailingAddress |
| CompanyName | LastModificationTime | *Send* |
| ComputerNetworkName | LastName | Sensitivity |
| *Copy* | LastNameAndFirstName | Size |
| CreationTime | MailingAddress | Spouse |
| *CustomAction* | MailingAddressCity | Subject |
| *CustomPropertyChange* | MailingAddressCountry | Suffix |
| *Delete* | MailingAddressPostalCode | TTYTDDTelephoneNumber |
| Department | MailingAddressPostOfficeBox | UnRead |
| EMail1Address | MailingAddressState | User1 |
| EMail1AddressType | MailingAddressStreet | User2 |
| EMail1DisplayName | ManagerName | User3 |
| Email1EntryID | MessageClass | User4 |
| EMail2Address | MiddleName | UserCertificate |
| EMail2AddressType | Mileage | WebPage |
| EMail2DisplayName | MobileTelephoneNumber | *Write* |
| EMail2EntryID | *Move* | YomiCompanyName |
| EMail3Address | NickName | YomiFirstName |
| Email3AddressType | NoAging | *SaveAs* |
| Email3EntryID | OfficeLocation | |
| Email3EntryID | Open | |

| LEGEND | |
|---|---|
| *Event* | Property/Object |
| Property | ReadOnly |
| *Method* | |

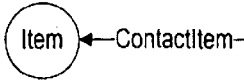

FIGURE 4

| | | |
|---|---|---|
| AlternateRecipientAllowed | *FormDescription* | ReminderSoundFile |
| AutoForwarded | *Forward* | ReminderTime |
| BCC | *Forward* | RemoteStatus |
| BillingInformation | Importance | *Reply* |
| Body | LastModificationTime | *Reply* |
| Categories | MessageClass | *ReplyAll* |
| CC | Mileage | *ReplyAll* |
| ClearConversationIndex | *Move* | ReplyRecipientNames |
| *Close* | NoAging | *ReplyRecipients* |
| Close | *Open* | *Save* |
| Companies | OriginatorDeliveryReportRequested | *SaveAs* |
| ConversationIndex | OutlookInternalVersion | Saved |
| ConversationTopic | OutlookVersion | *SaveSentMessageFolder* |
| *Copy* | *PrintOut* | *Send* |
| CreationTime | PropertyChange | *Send* |
| CustomAction | Read | SenderName |
| CustomPropertyChange | ReadReceiptRequested | Sensitivity |
| DeferredDeliveryTime | ReceivedByEntryID | SentOn |
| *Delete* | ReceivedByName | SentOnBehalfOfName |
| DeleteAfterSubmit | ReceivedOnBehalfOfEntryID | Size |
| *Display* | ReceivedOnBehalfOfName | Subject |
| EntryID | ReceivedTime | To |
| ExpiryTime | RecipientReassignmentProhibited | UnRead |
| FlagDueBy | ReminderOverrideDefault | VotingOptions |
| FlagRequest | ReminderPlaySound | VotingResponse |
| FlagStatus | ReminderSet | *Write* |

—MailItem→ Item

| | |
|---|---|
| Body | MessageClass |
| Categories | *Move* |
| *Close* | *Open* |
| Close | *PrintOut* |
| Color | PropertyChange |
| *Copy* | Read |
| CreationTime | *Reply* |
| CustomAction | *ReplyAll* |
| CustomPropertyChange | *Save* |
| *Delete* | *SaveAs* |
| *Display* | Saved |
| EntryID | *Send* |
| *Forward* | Size |
| Height | Subject |
| LastModificationTime | Top |
| Left | Width |
| | *Write* |

—NoteItem→ Item

FIGURE 4 (continued)

| LEGEND | |
|---|---|
| *Event* | *Property Object* |
| Property | ReadOnly |
| *Method* | |

| | | |
|---|---|---|
| ActualWork | *FormDescription* | Reply |
| *Assign* | Forward | ReplyAll |
| BillingInformation | Importance | *Respond* |
| Body | IsRecurring | ResponseState |
| *CancelResponseState* | LastModificationTime | Role |
| CardData | *MarkComplete* | *Save* |
| Categories | MessageClass | *SaveAs* |
| *ClearRecurrencePattern* | Mileage | Saved |
| *Close* | Move | SchedulePlusPriority |
| Close | NoAging | Send |
| Companies | Open | *Send* |
| Complete | Ordinal | Sensitivity |
| Contacts | OutlookInternalVersion | Size |
| *Copy* | OutlookVersion | *SkipRecurrence* |
| CreationTime | Owner | StartDate |
| *CustomAction* | Ownership | Status |
| CustomPropertyChange | *PrintOut* | StatusOnCompletionRecipients |
| DateCompleted | PropertyChange | *StatusReport* |
| DelegationState | Read | StatusUpdateRecipients |
| Delegator | ReminderOverrideDefault | Subject |
| *Delete* | ReminderPlaySound | TeamTask |
| *Display* | ReminderSet | TotalWork |
| DueDate | ReminderSoundFile | UnRead |
| EntryID | ReminderTime | Write |

—TaskItem→ ( Item )

FIGURE 5

| LEGEND | |
|---|---|
| Event | 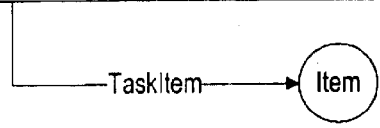 |
| Property | ReadOnly |
| *Method* | |

| AllDayEvent | IsRecurring | ReminderSet |
|---|---|---|
| BillingInformation | LastModificationTime | ReminderSoundFile |
| Body | Location | Reply |
| BusyStatus | MeetingStatus | ReplyAll |
| Categories | MessageClass | ReplyTime |
| ClearRecurrencePattern | Mileage | RequiredAttendees |
| Close | Move | Respond |
| Close | NoAging | ResponseRequested |
| Companies | Open | ResponseStatus |
| Copy | OptionalAttendees | Save |
| CreationTime | Organizer | SaveAs |
| CustomAction | OutlookInternalVersion | Saved |
| CustomPropertyChange | OutlookVersion | Send |
| Delete | PrintOut | Send |
| Display | PropertyChange | Sensitivity |
| Duration | Read | Size |
| End | Property | Start |
| EntryID | ReminderMinutesBeforeStart | Subject |
| FormDescription | ReminderOverrideDefault | UnRead |
| Forward | ReminderPlaySound | Write |
| Importance | | |

—AppointmentItem→ Item

| BillingInformation | ExpiryTime | Read |
|---|---|---|
| Body | FormDescription | ReceivedTime |
| Categories | Forward | Reply |
| ClearConversationIndex | Forward | Reply |
| Close | Importance | ReplyAll |
| Close | LastModificationTime | Save |
| Companies | MessageClass | SaveAs |
| ConversationIndex | Mileage | Saved |
| ConversationTopic | Move | Send |
| Copy | NoAging | SenderName |
| CreationTime | Open | Sensitivity |
| CustomAction | OutlookInternalVersion | SentOn |
| CustomPropertyChange | OutlookVersion | Size |
| Delete | Post | Subject |
| Display | PrintOut | UnRead |
| EntryID | PropertyChange | Write |

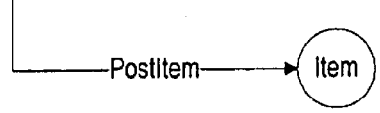

—PostItem——→ Item

| LEGEND | |
|---|---|
| Event | Property Object |
| Property | ReadOnly |
| Method | |

FIGURE 6

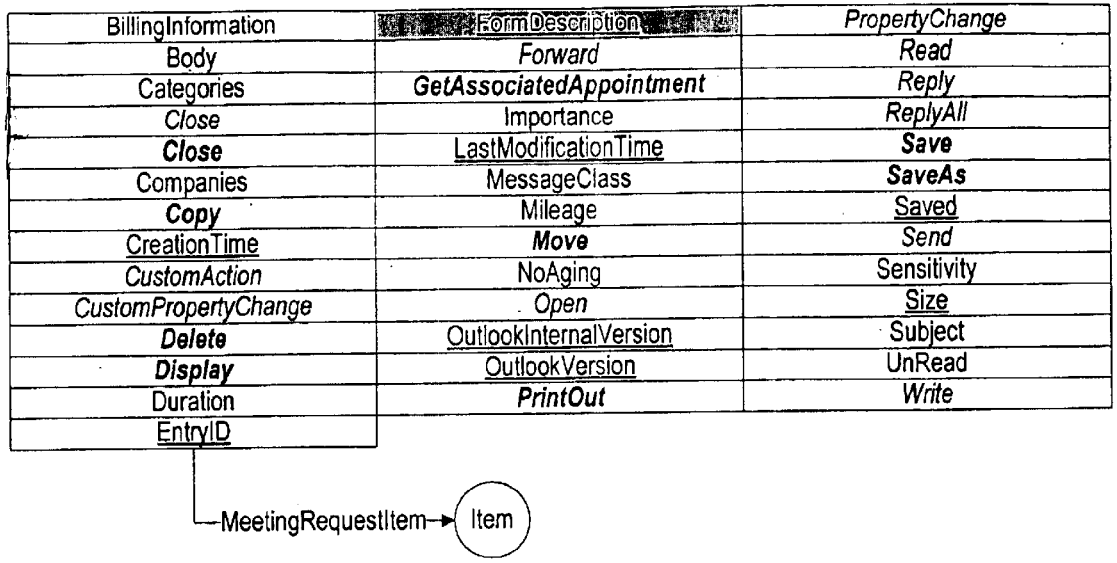
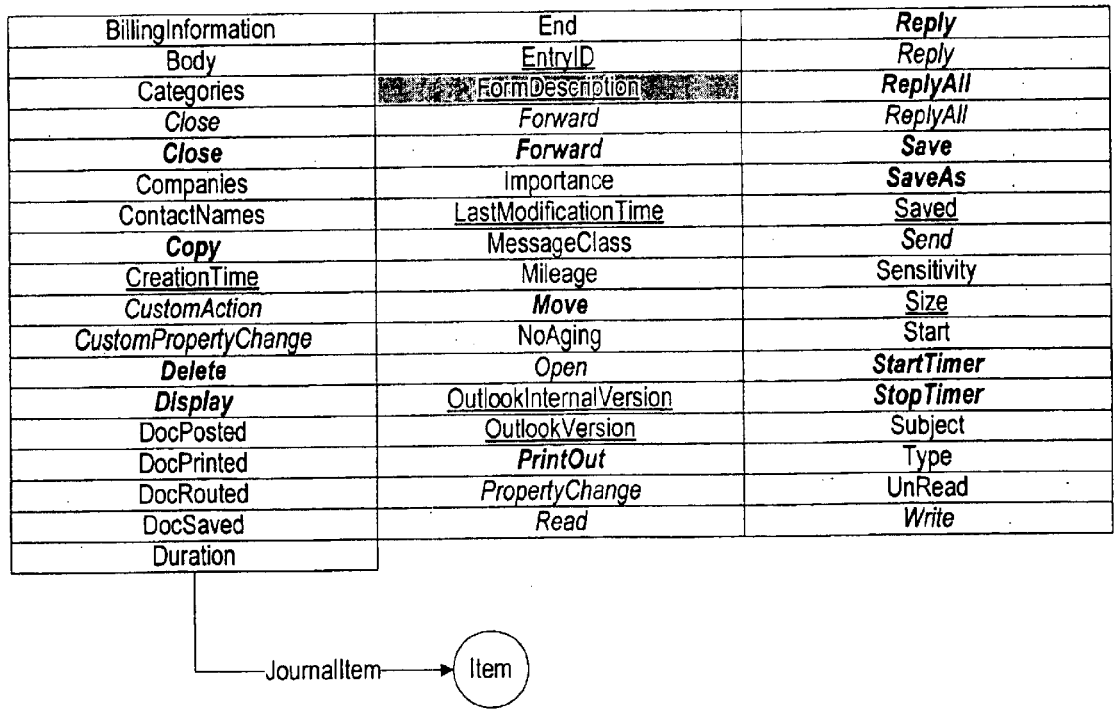
FIGURE 6 (continued)

REMOVING DUPLICATE OBJECTS FROM AN OBJECT STORE

TECHNICAL FIELD

This invention relates generally to computer utility programs and, more particularly, relates to computer programs which remove duplicate files or objects.

BACKGROUND OF THE INVENTION

Computer users often use more than one computer during the day, inputting and changing information on many different computing machines. To provide to the user the most recent data, a synchronization is required between each of the machines on which the user has changed or added data. Synchronization involves a comparison of the files resident on one machine to the files resident on another. If the file only exists on one machine, then it is copied to the other. If both contain the file, then the most recent version will be copied from one machine to the other. In such a manner both machines will ultimately contain the same files, and the files contained on each machine will reflect the user's latest edits. If the more than two machines need to be synchronized, multiple synchronizations may be required.

Because of the nature of most synchronization software, multiple copies of the same file may be created. The files, containing insignificant variations, are not exactly the same, and may therefore be treated as two separate files by the synchronization software. The synchronization software will therefore copy each to the other machine, instead of comparing the two and copying only the most recent version. As a result, instead of having only the latest version, the user finds all of the previous versions available as well. This is a waste of computer resources, and can result in user confusion.

The problem is compounded when the files may be created and edited by someone other than the user. For example, if the user is using an information management program, such as Microsoft® OUTLOOK from Microsoft Corporation, multiple copies of identical files may be created, not only by the synchronization process between the user's machines, but also by the messages sent by others through an email system. For example, a user may receive an email message with an attached file. The same email message may then get forwarded to the user from a different colleague. Finally, the user may update the file attached to the message on a handheld computer and then synchronize it to the desktop computer. The user now has potentially three copies of the same message, and yet needs only one. However, because the messages are not strictly identical, the synchronization program will not recognize that they are the same file, and will copy each file to every machine. The user will therefore find three copies of the same message on both their handheld and desktop computers.

SUMMARY OF THE INVENTION

Therefore, the present invention is directed to a more flexible method for removing duplicate objects from an object store.

The present invention is also directed to a method of comparing objects based on user selected criteria and special cases, to determine whether two objects are duplicates.

The present invention provides a user interface, which allows the user to select which properties of the objects in the object store will be compared to determine equivalency. A unique identifying number can then be calculated based on the values of those properties. Objects which have the same number therefore have the same user selected properties, and are equivalent according to the user's criteria. Some properties may require modification prior to the calculation of the unique identifying number. For example, a telephone field should yield the same value whether the telephone number includes dashes between the area code, prefix and suffix; parentheses around the area code; or spaces between the area code, prefix and suffix. Thus, the dashes, parentheses, and spaces need to be removed prior to calculation, so that the same telephone numbers result in the calculation of the same unique identifying number, regardless of the format of the telephone number. Once two objects are calculated to have the same unique identifying number, and are thus considered identical, either one can be removed. However, some "identical" objects may differ because one of the objects can contain a link to other objects. The object without the link should be the one removed, so that the user's changes to the remaining object can be accurately updated via the link. Therefore, prior to removal of "duplicate" objects, the system can check for links in the objects and remove the ones without links.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4 is a diagram illustrating the composition of some of the objects of Microsoft® OUTLOOK;

FIG. 6 is another diagram illustrating the composition of some of the objects of Microsoft® OUTLOOK;

DETAILED DESCRIPTION OF THE INVENTION

Figure 1:
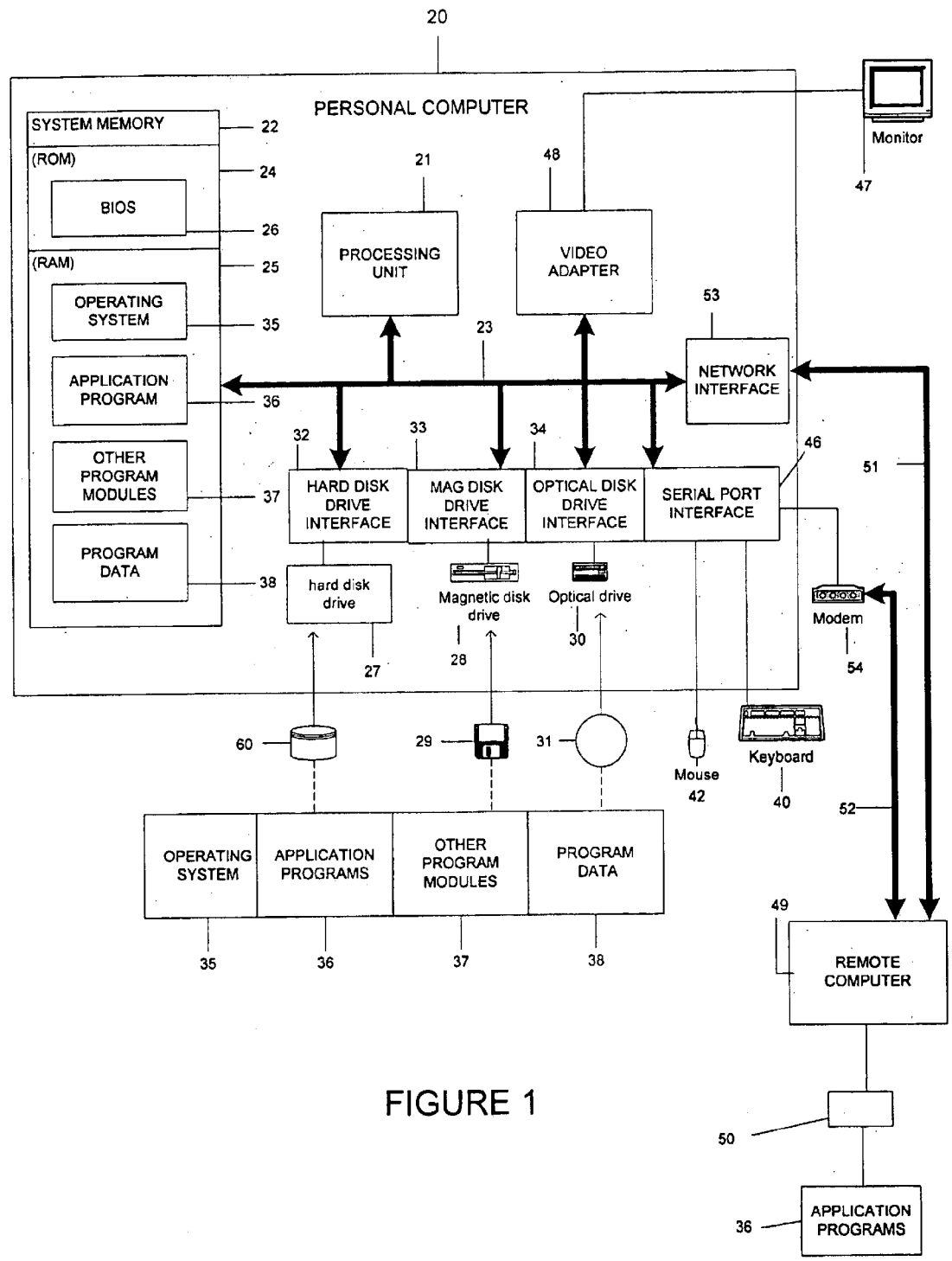
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
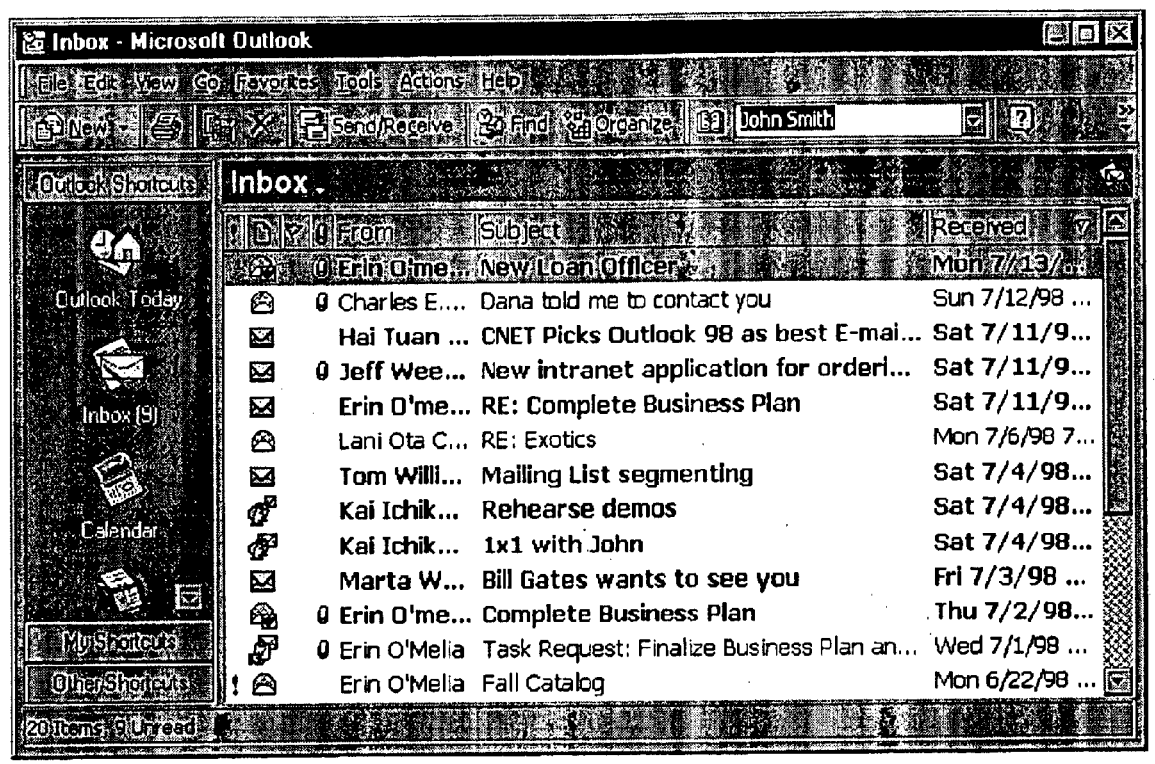
FIG. 2 is an exemplary information management application with which the present invention can be used.
Figure 3:
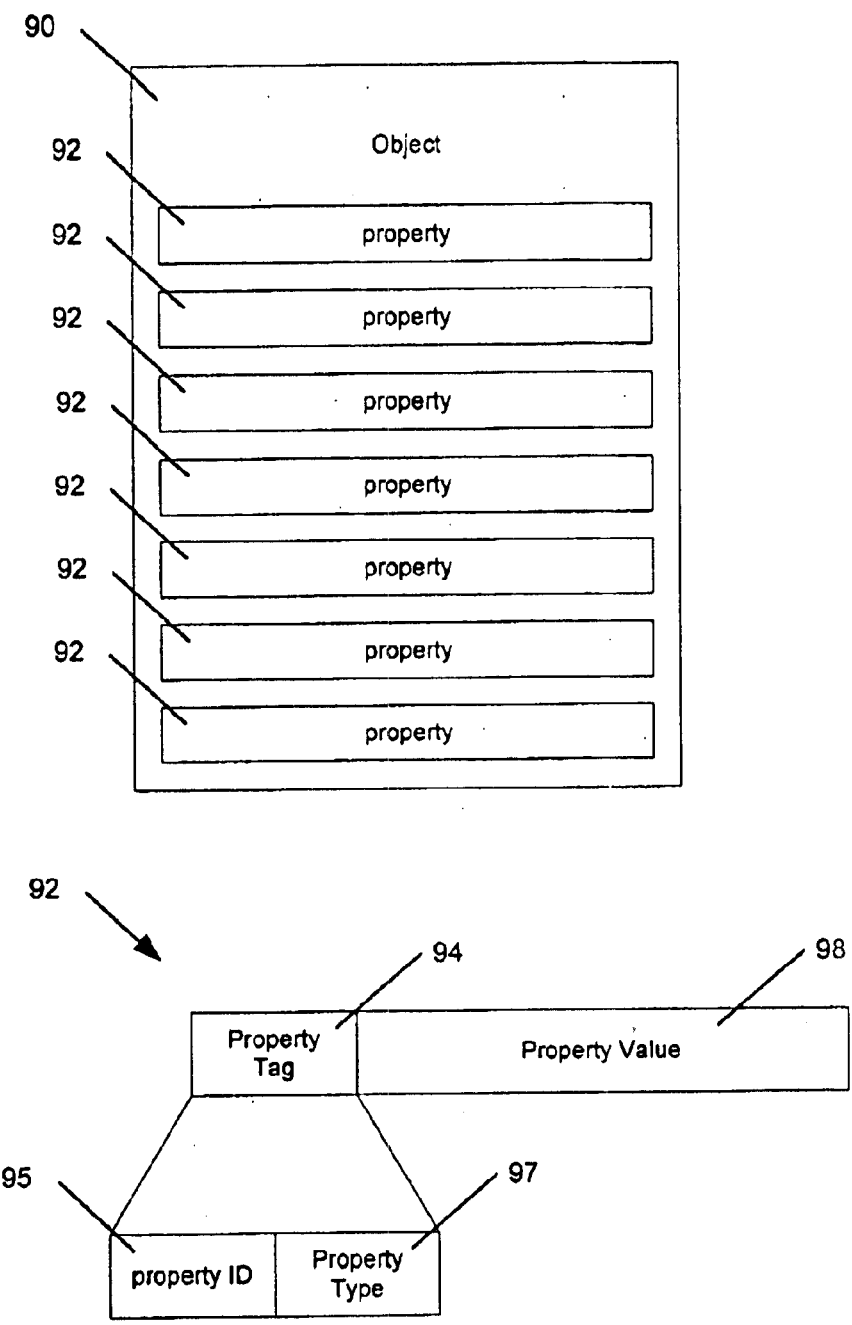
FIG. 3 is a block diagram generally illustrating an object according to the present invention.
Figure 5:
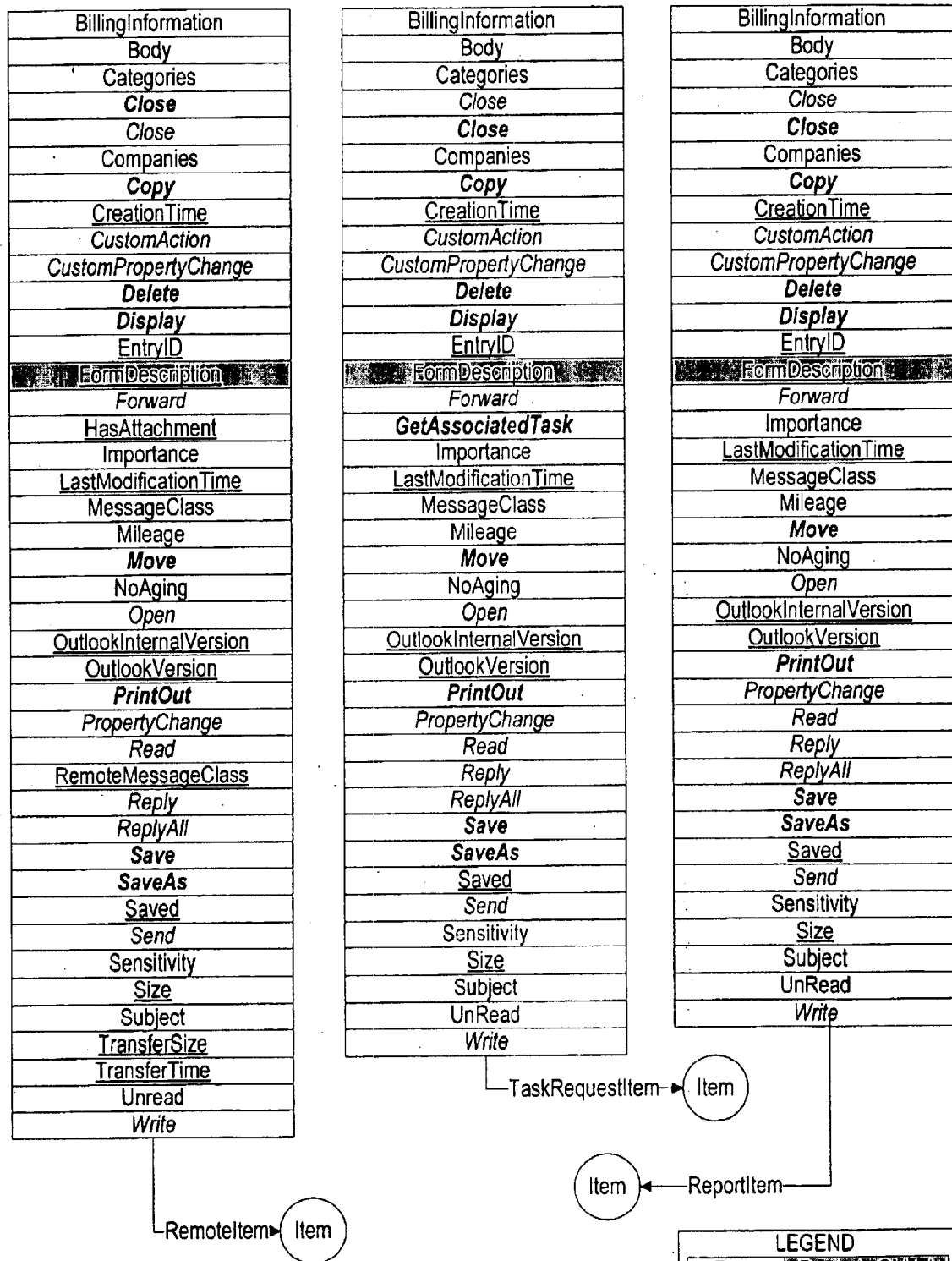
FIG. 5 is another diagram illustrating the composition of some of the objects of Microsoft® OUTLOOK.

In accordance with the invention, FIG. 2 illustrates an exemplary user interface for an information management program. By way of example only, one such information management program is Microsoft® OUTLOOK from Microsoft Corporation. An information management program can create computer readable objects with certain properties. An object, such as object 90 shown in FIG. 3, is defined as a set of properties 92. For example, each message shown in the "Inbox" illustrated in FIG. 2 is an object. The properties of such an object can include the sender, the recipient, the subject, the date sent, the date received, and attachments. Each property 92, in FIG. 3, includes a property tag 94 and a property value 98. The property tag 94 can be a 32-bit number where the most significant 16 bits are the property ID 95 and the least significant 16 bits are the property type 97. The property value 98 can vary in length, depending on the property type 97. FIGS. 4, 5, and 6 illustrate the properties for various types of objects which can exist in an object store of an information management program. As can be seen in FIG. 4, a MailItem, the message object from the Inbox of FIG. 2, can have many such properties.

Because of the numerous properties which can exist for a given object, it can be rare to find two objects which are identical, where each property in one object is the same as the corresponding property in the other object. Furthermore, the user may consider objects to be functionally equivalent without the objects necessarily being identical. The present invention provides the user with the ability to select which properties of the objects will be compared to determine functional equivalency.

As will be described in more detail below, once the user has selected the properties which will be used to determine function equivalency, the present invention reads all of the objects. The application need not obtain the value of all of the properties. Rather only the values of the critical properties (properties selected by the user to be compared) need be read. Once the critical properties have been read into the application, some will have to be modified because of special cases which will be explained further below. Once the properties have been read an modified, they are fed into a Cyclic Redundancy Check (CRC) calculator, which calculates a unique identifying value, or signature, from the values of the properties. The signatures are then sorted. The objects whose signatures are the same must, by definition, have the same values in the critical properties. Objects with the same signatures are, for the user's purposes, functionally equivalent, and only one such object is kept. In such a way all functionally equivalent duplicates are discarded.

Figure 7:
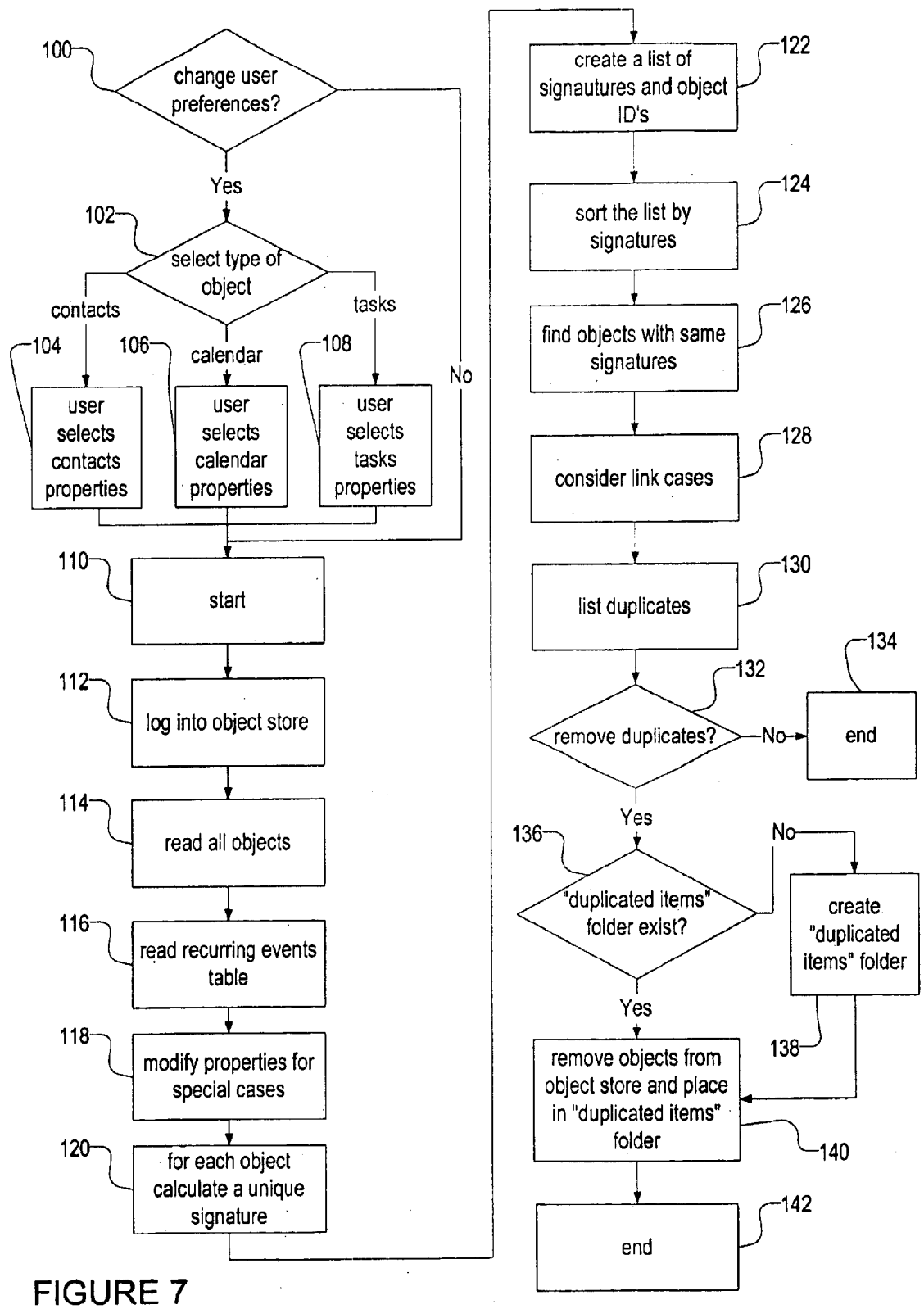
FIG. 7 is a flow chart generally illustrating the operation of the present invention.
Figure 8:
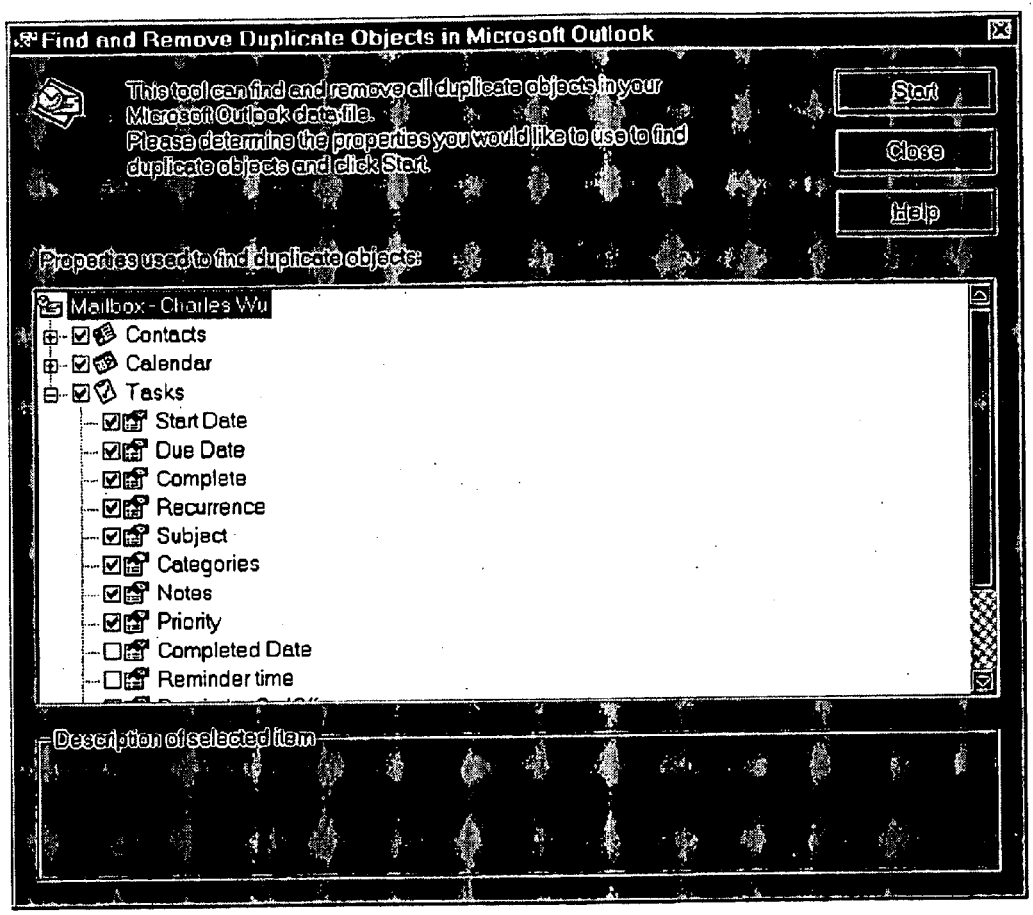
FIG. 8 is an exemplary user interface according to the present invention.

Turning now to FIG. 7, in step 100 the user is given the option of changing or setting the properties which will be compared to determine equivalency. At step 102 the user is allowed to select the type of object which will be compared. As can be seen from FIGS. 4, 5, and 6, different types of objects have different types of types of properties. Therefore, the user can select different properties to be compared depending on the type of objects which will be searched for duplicates. As an example only, FIG. 7 illustrates the steps of the application for three types of objects. At step 104, the user can select the properties to be compared for contacts objects, at step 106 the user can select the properties to be compared for calendar objects, and at step 108 the user can select task object properties to be compared. As will be known by those skilled in the art, the user can be presented with any number of types of objects at step 102. One exemplary user interface for presenting the user the option of selecting the properties to be compared is shown in FIG. 8.

Once the user has specified the properties of the objects which will be compared to determine equivalency, the application can begin, as indicated, at step 110 in FIG. 7. The application can first log into the object store at step 112. This may be required if the information management program is password protected, or otherwise requires a login to identify the user. The application then reads all of the objects in the object store of the information management program at step 114. The objects can be read using any one of a number of protocols, such as the Microsoft® OUTLOOK Object Model, or the Messaging Application Programming Interface (MAPI). An object is "read" by obtaining the data in each of the object's properties. To increase efficiency, the present invention need only obtain the data from the properties selected by the user, since only those properties will be used in computing the signature, as described in more detail below.

At step 116, in FIG. 7, the application can read the recurring events table. As will be known to those of skill in the art, information management applications often create separate objects should the user require a recurring event, such as a weekly meeting, a birthday or an anniversary. Such objects, which will be described in more detail below, can be stored in a table, so that all recurring events are located in one place. The present invention can read the objects in the table, whether or not any of the properties in those objects have been selected by the user. The properties of the objects in the recurring events table will aid the application in determining which duplicate objects in the object store can be removed, as will be described in more detail below.

At step 118, the application can modify the selected properties it has read. Certain properties may require modification to reflect the user's intent. For example, the user will consider the following telephone numbers to be identical: (123) 456-7890, 123-456-7890, and 123 456 7890. However, the numbers would not be identical to a computer, as spaces, parentheses, and dashes are all associated with different values. Thus, if the user had selected the telephone number property of an object as one of the properties to determine equivalence, two otherwise equivalent objects would be found to be different if the same telephone number was entered in different formats. The invention takes into account such special cases by temporarily editing appropriate properties prior to the calculation of the signature, to be described in more detail below.

One special case can be the problem of missing critical properties which can be calculated. For example, the user may have selected the duration property of a meeting to be included in the comparison process to determine equivalency. The duration property is thus a critical property: it is required for the comparison. However, some meeting appointment objects may not contain any data in the duration property; they may only have a start time and an end time. Given a start time and an end time, however, it is possible calculate the duration. Thus the duration property becomes a missing critical property which can be calculated. In such a case, the present invention will calculate the missing critical property prior to performing a comparison. Property relationships can be stored into the application so that the application can determine, when a critical property is missing, whether other properties can be used to derive the critical property. The other properties need not have been selected by the user. The application can, when attempting to calculate a missing critical property, read other properties not selected by the user. If the application finds that there are sufficient other properties, it can attempt to calculate the missing critical property.

A second special case which can be considered at step 118 in FIG. 7 is the case of a text field, such as a notes field in a contact object. A text field can have formatting options, such as font size or font color, which will be taken into account when the signature is calculated. The user, however, considers a message to "call Bill" to be the same message whether it is in large or small print or in red or black text. To reflect this reality, the application removes all formatting temporarily, prior to the calculation of the signature.

A third special case, related to the second special case above, concerns file attachments within the text fields. The application can determine equivalency by reference to the names of the attached files. However, while the user may consider the attachment "<file_A>, <file_Z>" to be equivalent to the attachment "<file_Z>, <file_A>" the application, in comparing the properties, will find them to be different. To avoid this result, all of the attachments are organized into alphabetical order by their names prior to comparing the properties. In this way an identical set of attachments will yield the same signature value.

A fourth special case, which can also be considered at step 118 in FIG. 7, is the situation where an object contains multiple categories. Information management applications often group objects by categories to facilitate the presentation of information to the user. For example, email could be categorized as an "email with attachment" and as an "email you responded to". The particular email message, the object in this case, would belong to the "email with attachment" category and the "email you responded to" category. The user would therefore find the message when viewing all the messages with attachments and when viewing all of the messages that the user responded to. The user would consider the order of the categories irrelevant: an email with the categories of "email with attachments" and "email you responded to" would be considered equivalent to an email with the categories of "email you responded to" and "email with attachment". However, the category values are fed into the CRC calculator to determine a signature number, and CRC calculations are order-dependent. Thus, to match the user's expectations, the present invention can reorder the categories in alphabetical order, prior to calculating the signature.

A fifth special case can be the problem of white space. As is known by those of skill in the art, a space, such as the spaces between the words of a text file, contains a finite, non-zero value. Therefore, when calculating a signature, a telephone property containing "123-456-7890" as an entry would result in a different signature than the same property containing an entry of "123-456-7890". However, the user would not expect that such leading or lagging spaces would affect the calculation. To reflect the user's perceptions, the invention can remove any leading or lagging spaces from entries in the properties. Spaces between the text, however, may contain significance to the user. For example, in a text field, the user may use spaces between text to line up items under columns. Therefore, spaces between the text are not removed by the present invention.

A sixth special case, which can be considered at step 118 in FIG. 7, involves "name properties". The property ID 95, shown in FIG. 3, can be 16 bits long, as was explained previously. However, should the property ID value exceed 8000 in hexadecimal, the value may not remain constant among different copies of the information management application. Such values are known in the art as "name properties". Thus, when such a property ID is used by the CRC calculator, in a manner to be described below, the signature values many be different among two objects which otherwise have identical critical properties. Therefore, to ensure consistency, the present invention can use the NameID reference of the property, rather than the property ID.

A seventh special case is the case of Boolean properties. As is known by those skilled in the art, a Boolean property of an object does not necessarily contain a value of either zero or one. Rather, a Boolean property with a value of zero is defined to be "false", while a Boolean property with any non-zero value is defined to be "true". Therefore, Boolean properties could have different values and yet still be "true", thus yielding different signature numbers for two functionally equivalent properties. The present invention, therefore, can change any non-zero Boolean property value to one prior to the calculation of the signature. In this way all, Boolean properties set to "true" have the same value for comparison purposes.

An eighth special case deals with recurring appointments. The problem is that many information management applications store recurring appointments as one object which describes the recurrence pattern for another object. For example, an appointment object can be linked to a recurrence object where the appointment object contains the name of the appointment, the location, the phone number, and the recurrence object contains the start time, the end time, the duration, and the appointment frequency (weekly, monthly, etc.). Objects such as these are known as "parent-child" objects, where the appointment object is the original object, and hence the "parent" and the recurrence object was created when the user modified the appointment object to become a recurring event, and thus is called the "child". As will be explained further below, parent-child objects are linked together. However, because the child object may contain more properties than the critical properties selected by the user, the present invention can parse the child object to obtain only the values of the critical properties. In this way, recurring events with functionally equivalent recurring event properties, such as frequency and duration, are found to be equivalent.

Once these special cases are taken into account, and the properties are modified accordingly, the invention proceeds to step 120 in FIG. 7 where it calculates the signature value. As has been previously mentioned, the signature value is calculated using a CRC calculator. The signature value is dependent on the order in which the properties are presented to the CRC calculator. Therefore, to ensure that the properties are always presented in the same order, the application can sort the properties using the property tag 94. Once the properties are sorted, the property value 98 is first provided to the CRC calculator. Then the property tag 94 is provided to the CRC calculator. The CRC calculator uses the values of the property value 98 and the property tag 94 to calculate a unique signature using the Cyclic Redundancy Check in a manner known to those of skill in the art. The calculation of the signature value from properties is further described in the co-pending application entitled USE OF OBJECT SIGNATURE PROPERTY AS A SEARCH PARAMETER DURING SYNCHRONIZATION OF OBJECTS ON A COMPUTER by Wu, filed on Mar. 16, 1999, and assigned to the assignee of the present application, which is incorporated herein by reference in its entirety.

Once the signature number has been calculated, the numbers can be sorted, at step 124 in FIG. 7, to facilitate comparison. Equivalent signatures will be located adjacent to each other after sorting. Therefore, at step 126, the application need only search for signatures directly above and below a given signature in the list to determine if there are any which are equivalent.

In MAPI the "EntryId" property contains an object identifier which points back to the object. The invention can use the "EntryId" to determine which object corresponds to which signature. Thus, once equivalent signatures are found, the "EntryId" is used to relate back to the appropriate objects in the object store. All but one of those objects can then be removed. The equivalent objects selected to be discarded can in most cases be selected randomly.

Prior to randomly discarding all but one of the objects which have the same signature, however, the present invention can consider link cases. Some of the objects with the same signature may include a link. Thus, while the objects are equivalent by the criteria selected by the user, and hence they have equivalent signature numbers, they are not identical, since some of the objects may contain a link. As is known by those skilled in the art, a link can allow automatic updating or messaging. For example, a meeting request object may contain a link to the other participants of the meeting. Therefore, if the user accepts the meeting request, all of the other participants can be notified automatically, via the link, that the user is planning on attending. Similarly, if the user deletes the meeting request object, all of the other participants can be automatically notified that the user does not wish to attend the meeting. It is therefore desirable, as between two equivalent objects, to retain the object which contains the link.

The invention considers these link cases at step 128 in FIG. 7. One type of link case is the recurring event object. As was explained previously, a recurring event object is a child object. The child object can have a link to the parent object so that changes to the parent can be reflected in the child. For example, a recurrence object is a child created when the user modifies a parent appointment object so that the parent's recurring property is set to "true". If the user were then to change the parent appointment object so that the parent's recurring property was set to "false", the child recurrence object would need to be discarded. A link between the parent and child objects allows that the child reflect such changes made in the parent. It is, therefore, beneficial to retain, as between equivalent objects, the object with a link. At step 116, the invention reads all of the child objects from the recurring events table. One of the properties of such a child object can be the link to the parent object. The present invention can, therefore, follow this link back and determine which object, of those found to be equivalent, is linked. The object with the link is then retained, while the other duplicates are collected in the list of duplicates at step 130. If more than one equivalent object contains a link, then the application will randomly select which of the objects with the link to retain.

A second type of link case is the meeting request object. A meeting request object can schedule a meeting for a user, and contains a link back to the requestor of the meeting. Deleting a meeting request object can cause the information management application to use the link to the requester to inform the requester that the user has canceled the meeting. To avoid undesired cancellations of meetings during the removal of duplicates, the present invention reads the objects with the same signature to determine which is an appointment object and which is a meeting request object. The meeting request object is then retained and the other equivalents are collected in the list of duplicates at step 130.

Once the application has completed the link cases at step 128, it builds a list of the duplicate objects at step 130. Some duplicate objects are placed in the list after the application considers the link cases at step 128, as described above. Other duplicate objects are chosen randomly so that only one object with a given signature number is retained and not placed in the list. The application then prompts the user at step 132 to remove the duplicates. Should the user not choose to remove the duplicates, the application ends at step 134. If the user chooses to remove the duplicates, then the application can check whether an appropriate folder, such as a "duplicated items" folder exists at step 136. If such a folder does not exist, the application can create one at step 138. If such a folder does exist, then the application can move the objects referenced by the signatures in the duplicates list from their original locations in the object store into the appropriate folder at step 140. The application then ends at step 142.

The application only relocates the objects, and does not permanently delete them. Thus, the user can recover any object which the user may not have desired to delete. It is also possible for the application to create a different folder for each pass through the object store. For example, the application could move the duplicate objects if found on its first pass into a folder entitled "duplicated items 1". Then, at a later time, when the user runs the application again, it could move the duplicate objects found the second time into a folder entitled "duplicated items 2". In such a way, the application could provide the user with undo functionality. To undo the most recent removal of duplicates the application, or the user, can simply return to the object store the objects from the "duplicated items" folder with the highest number.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A computer-readable medium have computer-executable instructions for performing steps comprising: prompting a user to select a property to compare; reading an object in an object store; modifying a special case property of the object; calculating a signature of the object based on a property selected by the user; and removing a first object signature equivalent to a second object signature of a second object in the object store.

2. The computer-readable medium of claim 1 wherein the prompting the user to select the property to compare comprises prompting the user to select an object type, and prompting the user to select the property to compare based on the object type.

3. The computer-readable medium of claim 1 wherein the reading the object comprises reading a value of a property of the object.

4. The computer-readable medium of claim 1 wherein the modifying the special case property of the object comprises deriving a value for a critical property which can be calculated.

5. The computer-readable medium of claim 1 wherein the modifying the special case property of the object comprises removing formatting from a text field property.

6. The computer-readable medium of claim 1 wherein the modifying the special case property of the object comprises alphabetizing an element of the special case property.

7. The computer-readable medium of claim 1 wherein the modifying the special case property of the object comprises removing white space from a text entry in a property.

8. The computer-readable medium of claim 1 wherein the modifying the special case property of the object comprises using a NameID instead of a property ID.

9. The computer-readable medium of claim 1 wherein the modifying the special case property of the object comprises changing a non-zero value of a Boolean property.

10. The computer-readable medium of claim 1 wherein the modifying the special case property of the object comprises obtaining a critical property from a child object.

11. The computer-readable medium of claim 1 wherein the calculating the signature based on the property selected by the user comprises feeding a value of the property selected by the user into a cyclic redundancy check calculator.

12. The computer-readable medium of claim 11 wherein the value of the property selected by the user is a value of the modified special case property selected by the user.

13. The computer-readable medium of claim 1 wherein the removing from the object store the first object comprises finding a link object, from the group comprising the first object and the second object, with a link.

14. The computer-readable medium of claim 13 wherein the removing from the object store the first object comprises retaining the link object.

15. The computer-readable medium of claim 1 wherein the removing from the object store the first object comprises moving the first object into a second object store.

16. A method of removing duplicate objects from an object store comprising:

prompting a user to select a property to compare; reading an object in an object store; modifying a special case property of the object; calculating a signature of the object based on a property selected by the user; and removing from the object store a first object with a first object signature equivalent to a second object signature of a second object in the object store.

17. The method of claim 16 wherein the prompting the user to select the property to compare comprises prompting the user to select an object type, and prompting the user to select the property to compare based on the object type.

18. The method of claim 16, wherein the reading the object comprises reading a value of a property of the object.

19. The method of claim 16 wherein the modifying the special case property of the object comprises deriving a value for a critical property which can be calculated.

20. The method of claim 16 wherein the modifying the special case property of the object comprises removing formatting from a text field property.

21. The method of claim 16 wherein the modifying the special case property of the object comprises alphabetizing an element of the special case property.

22. The method of claim 16 wherein the modifying the special case property of the object comprises removing white space from a text entry in a property.

23. The method of claim 22 wherein the value of the property selected by the user is a value of the modified special case property selected by the user.

24. The method of claim 16 wherein the modifying the special case property of the object comprises using a NameID instead of a property ID.

25. The method of claim 16 wherein the modifying the special case property of the object comprises changing a non-zero value of a Boolean property.

26. The method of claim 16 wherein the modifying the special case property of the object comprises obtaining a critical property from a child object.

27. The method of claim 16 wherein the calculating the signature based on the property selected by the user comprises feeding a value of the property selected by the user into a cyclic redundancy check calculator.

28. The method of claim 16 wherein the removing from the object store the first comprises finding a link object, from the group comprising the first object and the second object, with a link.

29. The method of claim 28 wherein the removing from the object store the first object comprises retaining the link object.

30. The method of claim 16 wherein the removing from the object store the first object comprises moving the first object into a second object store.

31. A computing device comprising:

a memory, having stored thereon an information management program and an object store;

a user interface comprising a property selection interface for a user to select a property to compare; and a processor performing steps comprising: reading an object in the object store, modifying a special case property of the object, calculating a signature of the object based on a property selected by the user, and removing from the object store a first object with a first object signature equivalent to a second object signature of a second object in the object store.

32. The computing device of claim 31 wherein the property selection interface further comprises an object type selection interface for the user to select an object type.

33. The computing device of claim 31 wherein the processor-performed step of reading the object in the object store comprises reading a value of a property of the object.

34. The computing device of claim 31 wherein the processor-performed step of calculating the signature based on the property selected by the user comprises feeding a value of the property selected by the user into a cyclic redundancy check calculator.

35. The computing device of claim 34 wherein the value of the property selected by the user is a value of the modified special case property selected by the user.

36. The computing device of claim 31 wherein the processor-performed step of removing from the object store the first object comprises finding a link object, from the group comprising the first object and the second object, with a link.

37. The computing device of claim 36 wherein the processor-performed step of removing from the object store the first object further comprises retaining the link object.

38. The computing device of claim 31 wherein the processor-performed step of removing from the object store the first object comprises moving the first object into a second object store.

\* \* \* \* \*